United States Patent [19]

Conway et al.

[11] 4,453,596

[45] Jun. 12, 1984

[54] METHOD OF TREATING SUBTERRANEAN FORMATIONS UTILIZING FOAMED VISCOUS FLUIDS

[75] Inventors: Michael W. Conway; Lewis R. Norman, both of Duncan, Okla.

[73] Assignee: Halliburton Company, Duncan, Okla.

[21] Appl. No.: 466,287

[22] Filed: Feb. 14, 1983

[51] Int. Cl.³ .............. E21B 43/04; E21B 43/26; E21B 43/27
[52] U.S. Cl. .................... 166/278; 166/307; 166/308; 166/312
[58] Field of Search .............. 166/307, 308, 309, 278, 166/276, 305 R, 312; 252/8.55 R, 8.55 C, 8.5 A, 8.5 C; 175/69, 206, 212

[56] References Cited

U.S. PATENT DOCUMENTS

| | | | |
|---|---|---|---|
| 2,947,647 | 8/1960 | Hart et al. | 428/141 |
| 3,136,361 | 6/1964 | Marx | 166/308 |
| 3,195,634 | 7/1965 | Hill | 166/308 X |
| 3,245,470 | 4/1966 | Henry | 166/308 |
| 3,251,417 | 5/1966 | Holman et al. | 166/309 X |
| 3,363,691 | 1/1968 | Gomory | 166/280 |
| 3,448,044 | 6/1969 | Garrett | 210/704 |
| 3,483,121 | 12/1969 | Jordan | 252/8.55 R |
| 3,486,560 | 12/1969 | Hutchison et al. | 166/292 |
| 3,593,800 | 7/1971 | Hutchison | 166/312 |
| 3,603,398 | 9/1971 | Hutchison | 166/278 X |
| 3,765,488 | 10/1973 | Pence, Jr. | 166/308 |
| 3,937,283 | 2/1976 | Blauer et al. | 166/307 |
| 3,980,136 | 9/1976 | Plummer et al. | 166/280 |
| 4,044,833 | 8/1977 | Volz | 166/307 |
| 4,126,181 | 11/1978 | Black | 166/280 |
| 4,152,289 | 5/1979 | Griffin, Jr. | 252/316 |
| 4,156,464 | 5/1979 | Hussin | 166/308 |
| 4,237,974 | 12/1980 | Scherubel | 166/281 |
| 4,237,975 | 12/1980 | Scherubel | 166/281 |
| 4,301,868 | 11/1981 | Scherubel | 166/308 |

*Primary Examiner*—Stephen J. Novosad
*Attorney, Agent, or Firm*—Robert A. Kent; Thomas R. Weaver

[57] ABSTRACT

A method of treating a subterranean formation penetrated by a well bore comprising injecting a gelled foamed fluid into said formation. The gelled foamed fluid is prepared by foaming an admixture of a fluid and a surface active foaming agent and admixing the foamed fluid with a gelled fluid whereby the foamed fluid is diluted by the gel to form the gelled foamed fluid.

20 Claims, 1 Drawing Figure

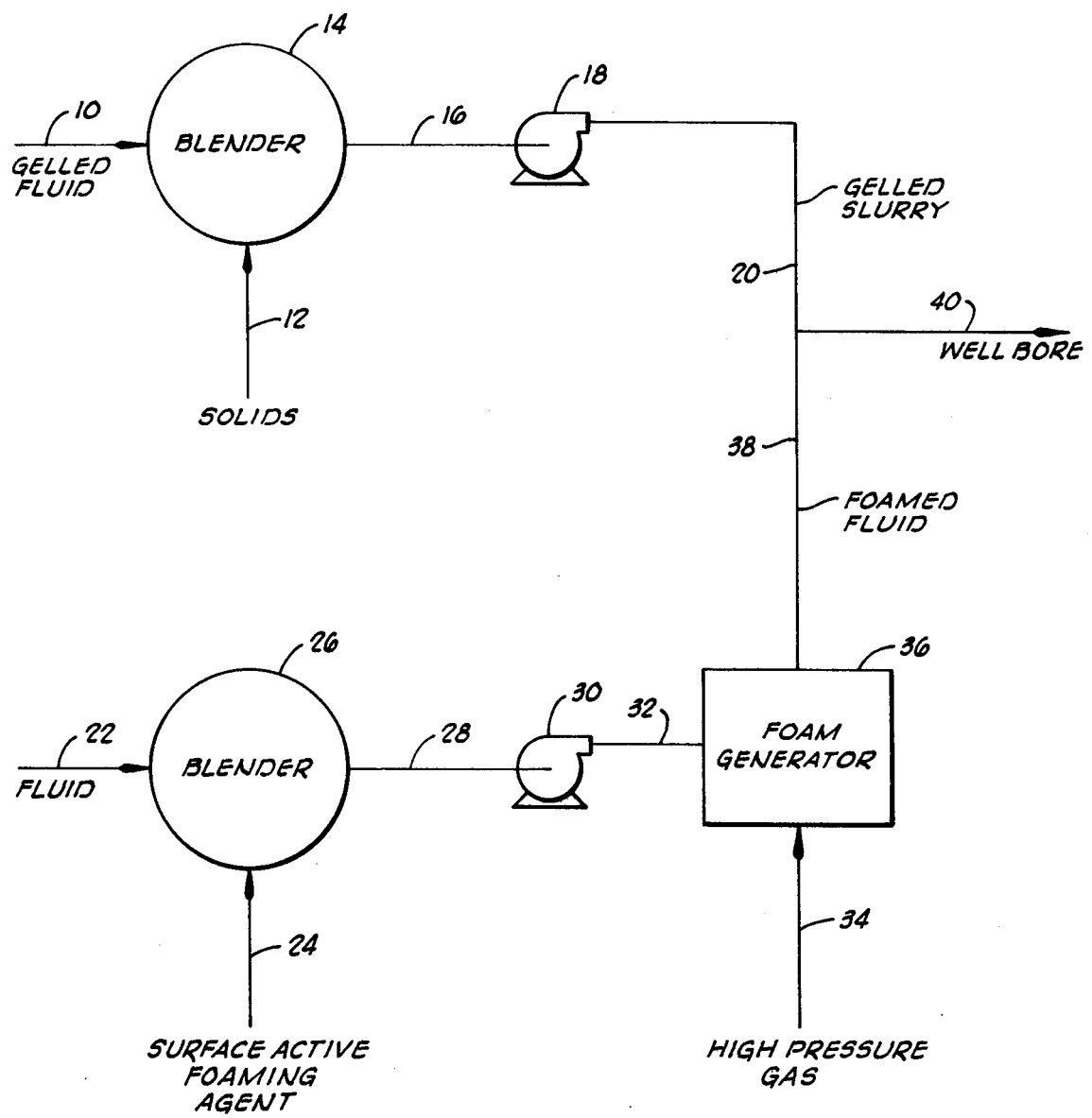

METHOD OF TREATING SUBTERRANEAN FORMATIONS UTILIZING FOAMED VISCOUS FLUIDS

BACKGROUND OF THE INVENTION

1. Field of the Invention

The invention relates to a method of foaming a viscous fluid. The foamed fluid is utilized in the stimulation of subterranean formations. The method also can be utilized in gravel packing operations, well bore cleanouts and the like.

2. Description of the Prior Art

The treatment of subterranean formations penetrated by a well bore to increase the productivity of the well is known in the art. Various methods are known to achieve increased productivity from a subterranean formation. Such methods include well stimulation, both to initially stimulate a well and to improve production from producing wells, formation stabilization, well bore cleanouts of producing wells and the like. With regard to well stimulation, emphasis has been placed on hydraulically fracturing formations with various liquids, which may contain propping agents suspended therein. When hydraulic pressure is applied to a subterranean formation by injection of a fluid into a well bore penetrating the formation, the pressure of the fluid creates tensile stresses in the rock of the formation. The stresses ultimately cause splitting, parting or fracturing of the rock. The initially formed fracture or fractures can be extended in the formation by continued injection of fluid under sufficient pressure into the formation. The fractures can be maintained in a partially open position by the placement of propping agents into the fractures or by acid etching techniques. When a propping agent is employed, it is introduced into the fracture in admixture with the treating fluid. When the pressure is released, the fractures in the formation close upon the etched faces of the fracture or the propping agent to create productive channels in the subterranean formation. The quantity of propping agent in the fluid is of significance because it effects the open width and height of the propped fracture.

Hydraulic fracturing with foamed fluids is a recent development. This process generally is known as "foam fracturing" and is generally described in U.S. Pat. No. 3,937,283. Briefly, the foam fracturing process involves generation of a foam of a desired quality. The quality is defined as the ratio of the volume of gas to the volume of foamed gas and liquids present under the conditions existing in the subterranean formation expressed as a percentage. Generally, it has been found desirable to utilize foams having a quality in the range of from about 50 to 99 percent. Various gases and liquids may be used to create the foam, but the usual foams are made from nitrogen or carbon dioxide and water in the presence of a suitable foaming agent. The foam is pumped into the formation at a temperature and pressure sufficient to cause a fracture in the subterranean formation.

Fracturing caused by the foam fracturing process is very effective and has many advantages over the known prior art methods. For example, foam fracturing can be carried out without significant fluid loss in comparison to treatments utilizing unfoamed liquids. Additionally, the foam comes out of the well easily when pressure is removed from the well head, because of the expansion of the foam when the pressure is released.

Foams produced in accordance with the prior art have one undesirable property, the maximum proppant concentration which can be obtained is quite low. Conventionally prepared foams generally can transport one to two pounds of proppant per gallon of foam. The proppant concentration can be increased by admixing gelling agents with the fluid which is to be foamed. However, the presence of a viscosifying agent in the fluid further increases the quantity of mechanical energy required to foam the fluid. It would be desirable to provide a means by which a foam can be produced which is capable of transporting a significant quantity of proppant into a subterranean formation with a minimum expenditure of mechanical energy.

SUMMARY OF THE INVENTION

The present invention provides a method for treating a subterranean formation utilizing a foamed gelled fluid which is stable, non-separating and capable of transporting significant quantities of a solid material. The foamed fluid can be formed with the input of less mechanical energy than is required to conventionally foam gelled fluids. The foamed fluid can be introduced into a well bore located in a subterranean formation and into the subterranean formation without significant settling of the solids from the fluid.

The present invention is accomplished by first producing a high quality foamed fluid, which then is admixed with a gelled fluid containing a solid material such as a proppant for fracturing treatments, graded gravel for gravel packing or the like. The fluid which is to be foamed is admixed with any suitable surface active foaming agent and this fluid then is foamed by the injection of a gas into the fluid. The gelled fluid should have sufficient viscosity to support the solid admixed therewith without significant settling. The foam and gelled fluid then are admixed whereby the gelled fluid dilutes the foam to produce a foam of a lesser quality while retaining its ability to transport a significant quantity of the solid material. The gelled foamed fluid then is introduced into a subterranean formation penetrated by a well bore to treat the formation.

BRIEF DESCRIPTION OF THE DRAWING

The drawing provides a schematic, diagrammatic illustration of one embodiment of the present invention.

DESCRIPTION OF THE PREFERRED EMBODIMENTS

Turning now to the drawing, in accordance with the method of the present invention, a gelled fluid is introduced into a blender 14 through a conduit 10. The gelled fluid can be prepared by any of the methods which are known to individuals skilled in the applicable arts. For example, the gelled fluid can be prepared by admixing a gelling agent, such as guar gum, with an aqueous fluid or a hydrocarbon-based fluid with an appropriate gelling agent in an amount sufficient to provide a fluid viscosity of at least 20 centipoise and preferably a viscosity in the range of from about 20 to about 80 centipoise.

The fluid of the gel can comprise any water-containing or hydrocarbon fluid which does not adversely react with the subterranean formation or the other fluid constituents. For example, the fluid can comprise an aqueous mineral or organic acid, an aqueous potassium chloride solution, formation water, brine, fuel oil, diesel, crude oil or the like.

The gelling agent employed to gel the fluid can comprise substantially any of the compounds known to function in the desired manner. For example, the gelling agent for water-containing fluids can comprise galactomannan gums and glucomannan gums and their derivatives and cellulose derivatives. Examples are guar gum, karaya gum, carboxymethylguar, hydroxypropylguar, hydroxyethylcellulose, carboxymethylcellulose, carboxymethylhydroxyethylcellulose and the like. The gelling agent for hydrocarbon fluids can comprise sodium or aluminum salts of fatty acids, alkyl phosphate aluminate salts or the like as well as any of the other gelling agents disclosed in U.S. Pat. No. 4,152,289 the entire disclosure of which is incorporated herein by reference.

If the presence of a solid particulate is desired in the final foam product, a solid particulate such as a propping agent is introduced into blender 14 through a conduit 12 to admix with the gelled fluid. The propping agent can comprise sand, resin-coated sand, graded gravel, crushed glass, glass beads, sintered bauxite, metal beads or the like. The solid particulate can be admixed with the gelled fluid in an amount of from about one pound to about 25 pounds per gallon of gelled fluid.

The gelled fluid and solid particulate, if present, are admixed within blender 14. The gelled slurry so formed is withdrawn from blender 14 through a conduit 16 and pumped by a pump 18 to an elevated pressure for discharge through a conduit 20 for admixing with a foamed fluid contained in a conduit 38.

The foamed fluid in conduit 38 is produced by introducing a fluid into a blender 26 through a conduit 22. A surface active foaming agent is introduced into blender 26 through a conduit 24. The surface active foaming agent is admixed with the fluid to be foamed and the mixture is withdrawn from blender 26 through a conduit 28.

The fluid to be foamed can comprise any water-containing or hydrocarbon fluid which does not adversely react to prevent the formation of a foam from the fluid. For example, the fluid can comprise an aqueous mineral or organic acid, an aqueous potassium chloride solution, formation water, brines, diesel, crude oil, methanol or the like.

The surface active foaming agent which is utilized in the practice of the present invention will depend upon the fluid which is employed and the type and character of the subterranean formation which is to be treated. The surface active foaming agent can comprise anionic, cationic, nonionic, amphoteric materials or mixtures thereof. Representative types of agents which can be employed in this invention include essentially all surface active agents with the capability of producing a foam. Representatives of some, but not all, of the general classes of these materials include alkoxylated alcohols, alkoxylated sulfated alcohols, alkyl sulfonates, aryl sulfonates, quaternary amine derivatives, alkyl amines reacted with sodium chloroacetate, alkali metal salts of fatty acids and the like. Specific surfactants include, for example, dodecyl alcohol reacted with seven moles of ethylene oxide, trimethyldodecylamine, tetradecylsulfonate and dimethyldecylamine reacted with sodium chloroacetate. In general, the surface active foaming agent will be admixed with the aqueous fluid in an amount of from about 0.1 to about 10 percent by volume of the total fluid present in the foam.

The aqueous mixture in conduit 28 is pumped by a pump 30 through a conduit 32 into a foam generator 36. In foam generator 36 a high pressure gas is introduced into the aqueous mixture in an amount and in a manner such that a foamed fluid is produced. The high pressure gas is introduced into foam generator 36 through a conduit 34 from any suitable supply source. The foam generator 36 can comprise any conventional foam generation apparatus.

The gas which is utilized in the practice of the present invention can comprise nitrogen, carbon dioxide, air, hydrocarbon gases, inert gases such as argon or helium and the like.

Preferably, the foam which is produced has a quality in the range of from about 50 to about 99 percent. The term "foam quality" as used herein means the percentage ratio of the volume of gas to the volume of gas and liquids present under the conditions existing in the subterranean formation.

A further advantage of the method of the present invention is that less mechanical energy is required to form the high quality foamed fluid produced in foam generator 36 than would be required to form a gelled foam by the previously described conventional methods. The mechanical energy required to foam a fluid appears to be related to the quantity of surface active foaming agent present in the fluid which is to be foamed. An increase in the concentration of the surface active foaming agent in the fluid reduces the relative amount of mechanical energy necessary to form a foam of the fluid. In the present method, the surface active foaming agent is admixed only with the volume of fluid which is to be foamed, no gelling agent or solid particulates are present. Thus, the concentration of the surface active foaming agent is higher in this volume of fluid than in the total volume of gelled foamed fluid. The relatively higher concentration of the surface active foaming agent facilitates foam formation and significantly reduces the mechanical energy required. This also significantly reduces the total quantity of surface active foaming agent which is required to produce the gelled foamed fluid product of the present invention in comparison to conventional methods.

The foamed fluid produced in foam generator 36 passes therefrom under elevated pressure through a conduit 38. The foamed fluid in conduit 38 contacts the gelled slurry in conduit 20 and the admixture comprising a gelled foamed fluid passes through a conduit 40 for introduction into a well bore which penetrates the subterranean formation which is to be treated.

Upon contacting of the foamed fluid with the gelled slurry, the slurry dilutes the external fluid phase surrounding the foam bubbles to produce a foam having a lesser quality, however, the relative size and stability of the foam bubbles remain substantially unchanged. Thus the foam bubbles remain a discontinuous phase in the gelled fluids resulting from admixing the soluble fluids together.

Preferably, the resulting gelled foamed fluid has a quality in the range of from about 50 to about 90 percent to facilitate suspension of any solid particulates which may be present.

For treatments of subterranean formations in which fracturing operations are effected, the gelled foamed fluid preferably has a quality in the range of from about 50 to about 80 percent to facilitate suspension of propping agents.

In fracturing operations, the gelled foamed fluid is injected into the well bore under sufficient pressure to create at least one fracture in the subterranean formation. An additional quantity of the fluid is pumped into the formation after creation of the fracture to extend the length of the fracture. Thereafter, the pressure applied in the fluid is reduced whereby said foam is caused to break and deposit the particulate present in the fluid to prop the fracture.

In an alternate embodiment of the invention, the gelled foamed fluid can be utilized in the performance of gravel packing operations. Previously, in conventional gravel packing operations, well screens were positioned in a well and gravel or other similar filter media was pumped through the lower end of the screen and displaced to a position between the exterior of the screen and the wall of the well. The gravel was transported in the form of an aqueous slurry or gelled slurry to facilitate pumping and the fluid then was permitted to filter into the formation or fluid returns were recovered at the surface. Those methods can introduce significant quantities of fluids into the formation which often is undesirable since the fluids sometimes can reduce the permeability of the subterranean formation.

Utilization of the method of the present invention permits gravel or similar filter media to be placed in a desired zone in a well bore without the introduction of significant quantities of fluids into the formation. The gravel packing operation is performed in the conventionally known manner; however, the filter media is transported in the gelled foamed fluid previously described. The gelled foamed fluid is produced by the hereinbefore described method. The presence of the gas in the foamed fluid facilitates fluid recovery from the well at the surface upon completion of the packing operation.

By the application of sufficient pressure, a portion of the gelled foamed fluid can be forced into a desired zone in the subterranean formation surrounding the well bore. Upon reduction in the pressure applied to introduce the fluid into the formation, the foam generally will break, depositing any solid present in the fluid and the fluid then will filter out into the subterranean formation.

In order to more clearly illustrate the effectiveness of the present invention in producing a quality gelled foamed fluid, and not by way of limitation, the following example is provided.

EXAMPLE

To compare the quality of a foam produced by the method of the present invention to a conventionally prepared foam, the following tests were performed.

Apparatus:

Laboratory size apparatus was arranged in accordance with the drawing FIGURE. In lieu of the blenders, the fluids were prepared in advance and stored in large holding tanks. The gelling agent utilized in the preparation of the gelled fluid was hydroxypropylguar. The surface active foaming agent was an ethoxylated dodecanol. The fluid was tap water. To avoid proppant settling in the gelled fluid holding tank, the proppant comprising 20-40 sand was added to the gel in a paddle blender and agitated prior to use. The pumps comprised progressive cavity MOYNO pumps manufactured by Robbins & Myers, Inc., Springfield, Ohio, and the foam generator comprised a Koch static mixer manufactured by Koch Engineering, Wichita, Kan., or a proprietary static mixer of conventional design. Samples of the gelled foamed fluid were collected in a ¾-inch I.D. clear acrylic plastic tube, 72 inches in height. Various flow meters, not illustrated in the drawing, manufactured by Kurz Instruments, Inc., Carmel Valley, Calif., were employed to measure fluid flow rates. The high pressure gas comprised nitrogen at a pressure of 200 psig.

Procedure:

Four sets of tests were performed in accordance with the method of the present invention and the conventional method of foaming gelled fluids upon fluids containing no proppant. Two sets of the test utilized one foam generator and the remaining two sets utilized the other foam generator as indicated in Table I. The gelled fluid had the concentration indicated in Table I. The flow rates of the water and gelled water are set forth in Table I. To simulate the conventional method of foaming gelled fluids, the prepared gel was admixed with the surface active foaming agent and introduced directly into the foam generator by substituting this gelled admixture for the normal feedstock of blender 26 of the drawing.

Two sets of the tests then were performed utilizing proppant present in the amounts indicated in the table. The foam generator was the proprietary static mixer. The data relating to these tests and the results are set forth in Table II.

TABLE I

| Method | Gel Concentration (Lb./1000 Gal.) | Gel Flow Rate (Gal./Min.) | Water Flow Rate (Gal./Min.) | Foam Generator | Foam Breakout Time, (Min.:Sec.) | Free Nitrogen Height in Tube (Inches) |
|---|---|---|---|---|---|---|
| Conventional | 20 | 9 | — | KOCH | 28:45 | 11.5 |
|  | 20 | 12 | — |  | >30:00 | 6.0 |
|  | 20 | 15 | — |  | >30:00 | 3.0 |
|  | 50 | 9 | — |  | >30:00 | 25.0 |
|  | 50 | 12 | — |  | >30:00 | 0 |
|  | 50 | 15 | — |  | >30:00 | 0 |
|  | 20 | 9 | — | Proprietary Design | 13:52 | 15.0 |
|  | 20 | 12 | — |  | 22:30 | 10.0 |
|  | 20 | 15 | — |  | >30:00 | 0 |
|  | 50 | 9 | — |  | 0 | 27.0 |
|  | 50 | 12 | — |  | >30:00 | 21.0 |
|  | 50 | 15 | — |  | >30:00 | 17.0 |
| Present Invention | 20 | 7.5 | 1.5 | KOCH | >30:00 | 0 |
|  | 20 | 10 | 2.0 |  | >30:00 | 0 |
|  | 20 | 12.5 | 2.5 |  | >30:00 | 0 |
|  | 50 | 7.5 | 1.5 |  | >30:00 | 0 |
|  | 50 | 10 | 2.0 |  | >30:00 | 0 |
|  | 50 | 12.5 | 2.5 |  | >30:00 | 0 |

TABLE I-continued

| Method | Gel Concentration (Lb./1000 Gal.) | Gel Flow Rate (Gal./Min.) | Water Flow Rate (Gal./Min.) | Foam Generator | Foam Breakout Time, (Min.:Sec.) | Free Nitrogen Height in Tube (Inches) |
|---|---|---|---|---|---|---|
| | 20 | 7.5 | 1.5 | Proprietary Design | >30:00 | 7.5 |
| | 20 | 10 | 2.0 | | >30:00 | 0 |
| | 20 | 12.5 | 2.5 | | >30:00 | 0 |
| | 50 | 7.5 | 1.5 | | >30:00 | 7.5 |
| | 50 | 10 | 2.0 | | >30:00 | 10.0 |
| | 50 | 12.5 | 2.5 | | >30:00 | 0 |

TABLE II

| Method | Gel Concentration (Lb/1000 Gal) | Sand Concentration (Lb/Gal of Gel) | Gel Flow Rate (Gal/Min) | Water Rate (Gal/Min) | Foam Quality (%) | Foam Breakout Time (Min:Sec) | Free Nitrogen Height In Tube (Inches) | Sand Settling Time (Min:Sec) |
|---|---|---|---|---|---|---|---|---|
| Conventional | 50 | 3.5 | 17.6 | — | 65 | >30:00 | 28.0 | >30:00 |
| | 50 | 4.0 | 12.5 | — | 75 | >30:00 | 8.0 | >30:00 |
| | 50 | 6.0 | 7.5 | — | 85 | >30:00 | 0 | >30:00 |
| Present | 50 | 4.0 | 16.1 | 1.3 | 65 | 30:00 | 0 | 19:40 |
| Invention | 50 | 5.0 | 10 | 2.1 | 75 | 30:00 | 0 | >30:00 |
| | 50 | 7.0 | 7.5 | 1.6 | 80 | 30:00 | 0 | >30:00 |

The data set forth in Tables I and II clearly illustrates the beneficial effects of practice of the present invention in the generation of gelled foamed fluids.

While that which is considered to be the preferred embodiment of the present invention has been described herein, it is to be understood that modifications, changes or the like can be made in the methods disclosed without departing from the spirit or scope of the invention as defined in the appended claims.

What is claimed is:

1. A method of treating a subterranean formation penetrated by a well bore comprising:
   providing an admixture of a fluid and a surface active foaming agent;
   foaming said fluid admixture by the injection of an elevated pressure gas into said fluid;
   providing a gelled fluid;
   admixing said gelled fluid with said foamed fluid whereby said foamed fluid is diluted by said gelled fluid to form a gelled foamed fluid; and
   injecting said gelled foamed fluid into said well bore to contact said subterranean formation.

2. The method of claim 1 wherein said surface active foaming agent is present in an amount of about 0.1 to about 10 percent by volume of the total fluid present.

3. The method of claim 1 wherein said gelled fluid is produced by the admixture of a gelling agent with an aqueous or hydrocarbon fluid in an amount sufficient to provide said gelled fluid with a viscosity in the range of from about 20 to about 80 centipoise.

4. The method of claim 1 wherein said foamed fluid has a foam quality in the range of from about 50 to about 99 percent.

5. The method of claim 1 wherein said gelled foamed fluid has a foam quality in the range of from about 50 to about 80 percent.

6. The method of claim 1 wherein said gelled fluid includes a solid particulate.

7. The method of claim 6 wherein said solid particulate is present in an amount of from about one pound to about 25 pounds per gallon of said gelled fluid.

8. The method of claim 1 wherein said gelled foamed fluid is utilized to fracture said subterranean formation and said injecting of said gelled foamed fluid is defined further as:
   injecting said gelled foamed fluid into said well bore under sufficient pressure to create at least one fracture in said formation.

9. A method of fracturing a subterranean formation penetrated by a well bore comprising:
   admixing a quantity of a surface active foaming agent with a first fluid;
   foaming said admixture by the injection of a gas to form a foamed fluid;
   admixing a quantity of a gelling agent with a second fluid in an amount sufficient to form a gelled fluid having a viscosity of at least 20 centipoise;
   admixing a quantity of a solid particulate with said gelled fluid to form a gelled slurry;
   admixing said foamed fluid with said gelled slurry whereby said foamed fluid is diluted by said gelled slurry to form a gelled foamed fluid;
   injecting said gelled foamed fluid into said well bore penetrating said subterranean formation under sufficient pressure to create at least one fracture in said formation;
   pumping an additional quantity of said gelled foamed fluid into at least a portion of said created fracture to extend said fracture and,
   thereafter reducing the pressure applied to said gelled foamed fluid whereby said foam is caused to break and deposit said solid particulate in said fracture.

10. The method of claim 9 wherein said surface active foaming agent is present in an amount of about 0.1 to about 10 percent by volume of the total fluid.

11. The method of claim 9 wherein said foamed fluid has a foam quality in the range of from about 50 to about 99 percent.

12. The method of claim 9 wherein said gelled foamed fluid has a foam quality in the range of from about 50 to about 80 percent.

13. The method of claim 9 wherein said gelled fluid has a viscosity in the range of from about 20 to about 80 centipoise.

14. The method of claim 9 wherein said solid particulate is present in an amount of from about 1 pound to about 25 pounds per gallon of gelled fluid.

15. A method of performing a gravel pack operation comprising:

admixing a quantity of a surface active foaming agent with a first fluid;

foaming said admixture by the injection of a gas to form a foamed fluid;

admixing a quantity of a gelling agent with a second fluid in an amount sufficient to form a gelled fluid having a viscosity of at least 20 centipoise;

admixing a quantity of a solid particulate with said gelled fluid to form a gelled slurry;

admixing said foamed fluid with said gelled slurry whereby said foamed fluid is diluted by said gelled slurry to form a gelled foamed fluid;

injecting said gelled foamed fluid into said well bore penetrating said subterranean formation; and depositing said solid particulate present in said gelled foamed fluid in a desired zone within said well bore.

16. The method of claim 15 wherein said solid particulate comprises graded gravel or sand.

17. The method of claim 15 wherein said surface active foaming agent is present in an amount of about 0.1 to about 10 percent by volume of the total fluid.

18. The method of claim 15 wherein said foamed fluid has a foam quality in the range of from about 50 to about 99 percent.

19. The method of claim 15 wherein said gelled foamed fluid has a foam quality in the range of from about 50 to about 80 percent.

20. The method of claim 15 defined further to include the steps of:

applying sufficient pressure to said gelled foamed fluid to force at least a portion of said fluid into a desired zone in said subterranean formation;

depositing at least a portion of said solid particulate present in said gelled foamed fluid in said desired zone of said subterranean formation; and reducing the pressure on said gelled foamed fluid whereby said foam is caused to break and at least a portion of the broken fluid filters into the formation.

* * * * *